(12) United States Patent
Hamdan et al.

(10) Patent No.: US 12,508,542 B2
(45) Date of Patent: Dec. 30, 2025

(54) METHOD AND SYSTEM FOR ELECTROCHEMICALLY COMPRESSING GASEOUS HYDROGEN

(71) Applicant: PLUG POWER INC., Latham, NY (US)

(72) Inventors: Monjid Hamdan, Worcester, MA (US); Cortney Mittelsteadt, Wayland, MA (US); Matthew Weaver, Cambridge, MA (US); Robert Stone, Danvers, MA (US)

(73) Assignee: Plug Power Inc., Slingerlands, NY (US)

( * ) Notice: Subject to any disclaimer, the term of this patent is extended or adjusted under 35 U.S.C. 154(b) by 73 days.

(21) Appl. No.: 18/392,311

(22) Filed: Dec. 21, 2023

(65) Prior Publication Data

US 2024/0123398 A1    Apr. 18, 2024

Related U.S. Application Data

(63) Continuation of application No. 17/162,654, filed on Jan. 29, 2021, now Pat. No. 11,883,779.
(Continued)

(51) Int. Cl.
*B01D 53/32*    (2006.01)
*C01B 3/02*    (2006.01)
(Continued)

(52) U.S. Cl.
CPC .............. *B01D 53/326* (2013.01); *C01B 3/02* (2013.01); *C25B 9/00* (2013.01); *C25B 9/19* (2021.01);
(Continued)

(58) Field of Classification Search
CPC .................. B01D 53/326; H01M 8/04149
See application file for complete search history.

(56) References Cited

U.S. PATENT DOCUMENTS

| 3,282,875 A | 11/1966 | Connolly et al. |
| 4,470,889 A | 9/1984 | Ezzell et al. |

(Continued)

FOREIGN PATENT DOCUMENTS

| EP | 3254747 A1 | 12/2017 |
| WO | 2012067650 A1 | 5/2012 |

OTHER PUBLICATIONS

"Experimental and modelling study of an electrochemical hydrogen compressor", Chemical Engineering Journal, 369: 432-442 (2019).
(Continued)

*Primary Examiner* — Harry D Wilkins, III
(74) *Attorney, Agent, or Firm* — Heslin Rothenberg Farley and Mesiti P.C.; Victor A. Cardona, Esq.

(57) ABSTRACT

Method and system for electrochemically compressing hydrogen. In one embodiment, the system includes a membrane electrode assembly (MEA) that includes a polymer electrolyte membrane (PEM), an anode, and a cathode. First and second gas diffusion media are positioned adjacent the cathode and anode, respectively. A humidifying membrane is positioned next to the second gas diffusion medium on a side opposite the anode. A water supply is connected to the humidifying membrane, and a hydrogen gas supply is connected to the second gas diffusion medium. A hydrogen gas collector including a back pressure regulator is connected to the first gas diffusion medium. Separators, positioned on opposite sides of the MEA, are connected to a power source. In use, hydrogen is electrochemically pumped across the MEA and collected in the hydrogen gas collector. The PEM
(Continued)

is kept properly humidified by the humidifying membrane, which releases water into the second gas diffusion medium.

19 Claims, 2 Drawing Sheets

Related U.S. Application Data

(60) Provisional application No. 63/002,614, filed on Mar. 31, 2020.

(51) Int. Cl.
| | | |
|---|---|---|
| *C25B 9/00* | (2021.01) | |
| *C25B 9/19* | (2021.01) | |
| *H01M 8/0273* | (2016.01) | |
| *H01M 8/04119* | (2016.01) | |
| *H01M 8/1004* | (2016.01) | |
| *H01M 8/1044* | (2016.01) | |
| *H01M 8/248* | (2016.01) | |
| *C25B 1/02* | (2006.01) | |
| *H01M 8/10* | (2016.01) | |

(52) U.S. Cl.
CPC ..... *H01M 8/0273* (2013.01); *H01M 8/04149* (2013.01); *H01M 8/1004* (2013.01); *H01M 8/1044* (2013.01); *H01M 8/248* (2013.01); *C25B 1/02* (2013.01); *H01M 2008/1095* (2013.01)

(56) References Cited

U.S. PATENT DOCUMENTS

| | | |
|---|---|---|
| 4,478,695 A | 10/1984 | Ezzell et al. |
| 5,547,551 A | 8/1996 | Bahar et al. |
| 6,492,431 B1 | 12/2002 | Cisar |
| 6,500,319 B2 | 12/2002 | LaConti et al. |
| 6,811,905 B1 | 11/2004 | Cropley et al. |
| 6,994,929 B2 | 2/2006 | Barbir et al. |
| 7,947,405 B2 | 5/2011 | Mittelsteadt et al. |
| 8,551,670 B2 | 10/2013 | Mittelsteadt et al. |
| 9,595,727 B2 | 3/2017 | Mittelsteadt et al. |
| 9,728,802 B2 | 8/2017 | Mittelsteadt et al. |
| 10,047,446 B2 | 8/2018 | Kaczur et al. |
| 10,109,880 B2 | 10/2018 | Blanchet et al. |
| 10,557,691 B2 | 2/2020 | Stone et al. |
| 11,883,779 B2 * | 1/2024 | Hamdan ............. H01M 8/1004 |
| 2004/0211679 A1 | 10/2004 | Wong et al. |
| 2006/0115696 A1 | 6/2006 | Kanai et al. |
| 2006/0183011 A1 | 8/2006 | Mittelsteadt et al. |
| 2009/0220845 A1 | 9/2009 | Mittelsteadt et al. |
| 2010/0227244 A1 | 9/2010 | Song et al. |
| 2014/0065510 A1 | 3/2014 | Mittelsteadt et al. |
| 2016/0108530 A1 | 4/2016 | Dioxide |

OTHER PUBLICATIONS

International Search Report and Written Opinion dated Jul. 8, 2021.

* cited by examiner

METHOD AND SYSTEM FOR ELECTROCHEMICALLY COMPRESSING GASEOUS HYDROGEN

CROSS REFERENCE TO RELATED APPLICATIONS

The present application is a continuation of U.S. patent application Ser. No. 17/162,654 filed on Jan. 29, 2021, which claims priority to U.S. Provisional Application No. 63/002,614 filed on Mar. 31, 2020, which are both incorporated herein by referenced in its entirety.

FEDERALLY SPONSORED RESEARCH OR DEVELOPMENT

This invention was made with government support under DOE DE-EE0007647 Cooperative Agreement entitled "Advanced Electrochemical Hydrogen Compressor" awarded by the US Department of Energy. The government has certain rights in the invention.

BACKGROUND OF THE INVENTION

The present invention relates generally to methods and systems for compressing gaseous hydrogen and relates more specifically to methods and systems for electrochemically compressing gaseous hydrogen. In addition, the present invention is also directed to novel electrochemical cells and to methods for making such electrochemical cells, as well as to components of such electrochemical cells and to methods for their manufacture.

For a variety of reasons including, but not limited to, growing environmental concerns, efforts to provide acceptable energy alternatives to fossil fuels have received considerable attention over the last several years. One area in which much effort has been made is in the development of hydrogen fuel cells. Hydrogen fuel cells present an attractive alternative to the combustion of fossil fuels because hydrogen fuel cells are capable of generating electricity simply by using hydrogen and oxygen gases as reactants, with water being the byproduct of fuel cell operation. Because oxygen is naturally present in air in abundance, the provision of oxygen to a fuel cell may be as simple as supplying air to the fuel cell. On the other hand, hydrogen is not naturally present in air in abundance; consequently, most fuel cells are coupled to some sort of hydrogen supply tank in which a volume of hydrogen gas is stored for use by the fuel cell.

One factor that has limited the use of hydrogen fuel cells in certain applications is the difficulty of filling or re-filling a hydrogen storage tank in a short period of time. For example, U.S. automakers have invested significant resources in the research and development of hydrogen fuel cell electric vehicles (FCEVs). However, to enable the widespread use of FCEVs, an infrastructure of efficient hydrogen fueling stations is required. In order to dispense hydrogen gas from a fueling station to FCEV tanks quickly, the hydrogen must be compressed in the fueling station to very high pressures, for example, at least 875 bar.

One technique for compressing gaseous hydrogen is with the use of a mechanical gas compressor. Unfortunately, however, mechanical gas compressors tend to have a high capital cost, high maintenance costs, and poor reliability. In addition, mechanical gas compressors tend to produce significant noise and heat. Moreover, the compressed hydrogen produced by a mechanical gas compressor often contains small amounts of pump oil and other contaminants from the compressor. The presence of such oil and other contaminants in the compressed hydrogen is disadvantageous as it degrades the performance of a fuel cell receiving the contaminated hydrogen. Most importantly, the cost of failure of even a single mechanical hydrogen compressor is very high as it requires that the refueling station where the compressor is located be repaired.

Another technique for compressing gaseous hydrogen is with the use of an electrochemical hydrogen compressor. An example of an electrochemical hydrogen compressor is disclosed in U.S. Patent Application Publication No. US 2004/0211679 A1, inventors Wong et al., which was published Oct. 28, 2004, and which is incorporated herein by reference in its entirety. More specifically, according to this published application, there is disclosed an apparatus and process for electrochemical compression of hydrogen. The apparatus is said to comprise a membrane electrolyte cell assembly (MEA), including planar gas distribution plates sandwiching the MEA, the assembly being held together by end-plates, the end-plates having complementary peripheral grooves for seating an intervening seal between the end-plates and the MEA, the end-plate on the anode side further including a hydrogen supply inlet and the end-plate on the cathode side further including a compressed hydrogen outlet. Both single cell and multi-cell assemblies are disclosed. The multi-cell assemblies comprise a plurality of such single cells electrically connected in series with parallel gas porting, such that the compressed hydrogen from the outlet of each individual cell is connected, where each cell is electrically isolated from the adjacent cell in the series.

Additional examples of electrochemical hydrogen compressors and/or information relating to electrochemical hydrogen compressors may be found in the following documents, all of which are incorporated herein by reference in their entireties: U.S. Pat. No. 10,109,880 B2, inventors Blanchet et al., which issued Oct. 23, 2018; U.S. Pat. No. 6,994,929 B2, inventors Barbir et al., which issued Feb. 7, 2006; European Patent Application Publication No. EP 3 254 747 A1, which published Dec. 13, 2017; and Nordio et al., "Experimental and modelling study of an electrochemical hydrogen compressor," *Chemical Engineering Journal*, 369: 432-442 (2019).

For electrochemical hydrogen compressors of the type that employ a proton exchange membrane (PEM) as part of a membrane electrode assembly, one issue that must be addressed is proper humidification of the proton exchange membrane. In other words, if the proton exchange membrane is not maintained at an appropriately humidified state during its operation, it will not function properly. Unfortunately, the maintenance of proper humidification of the proton exchange membrane of an electrochemical hydrogen compressor is made more difficult by the fact that, as the compressor is operated, not only are hydrogen ions (i.e., protons) transported across the proton exchange membrane but so are water molecules. Moreover, water management in PEM-based electrochemical hydrogen compressors is particularly difficult to maintain at high differential operating pressures as the hydraulic permeation of water from the high pressure cathode to the low pressure anode is proportional to the differential pressure, resulting in the requisite water being forced out of the MEA. Consequently, to compensate for the aforementioned water loss from the proton exchange membrane, water must be added continuously to the proton exchange membrane to maintain its humidification. Typically, this is achieved by humidifying the supply of hydrogen gas prior to its delivery to the electrochemical hydrogen compressor (e.g., by bubbling the hydrogen gas through a volume of water prior to its delivery to the electrochemical hydrogen compressor). However, such an approach not only adds cost but also involves complexities associated with humidification at certain pressures, temperatures and flows and typically does not result in sufficient humidification to enable compression to the types of pressures that are desired in practice.

Other documents that may be of interest may include the following, all of which are incorporated herein by reference in their entireties: U.S. Pat. No. 10,557,691 B2, inventors Stone et al., which issued Feb. 11, 2020; U.S. Pat. No. 9,595,727 B2, inventors Mittelsteadt et al., which issued Mar. 14, 2017; U.S. Pat. No. 9,728,802 B2, inventors Mittelsteadt et al., which issued Aug. 8, 2017; U.S. Pat. No. 8,551,670 B2, inventors Mittelsteadt et al., which issued Oct. 8, 2013; U.S. Pat. No. 7,947,405 B2, inventors Mittelsteadt et al., which issued May 24, 2011; U.S. Pat. No. 6,811,905, inventors Cropley et al., which issued Nov. 2, 2004; and U.S. Pat. No. 6,500,319, inventors LaConti et al., which issued Dec. 31, 2002.

SUMMARY OF THE INVENTION

According to one aspect of the invention, there is provided an electrochemical device, the electrochemical device comprising (a) a polymer electrolyte membrane, said polymer electrolyte membrane having opposing first and second faces; (b) an anode coupled to the first face of said polymer electrolyte membrane; (c) a cathode coupled to the second face of said polymer electrolyte membrane; and (d) a water management device coupled to the anode or the cathode for use in delivering water thereto, said water management device being electrically non-conductive, permeable to liquids, and substantially impermeable to gases, said anode or said cathode being positioned between the water management device and the polymer electrolyte membrane. Alternatively, in another embodiment, the water management device may be electrically conductive.

In a more detailed feature of the invention, the electrochemical device may further comprise an anodic gas diffusion medium, said anodic gas diffusion medium may define an anode chamber, said anode chamber may be in fluid communication with said anode, and said anodic gas diffusion medium may be positioned between at least a portion of said water management device and said anode.

In a more detailed feature of the invention, the entirety of said water management device may be spaced apart from said anode.

In a more detailed feature of the invention, said water management device may have a planar shape.

In a more detailed feature of the invention, said water management device may have a non-planar shape.

In a more detailed feature of the invention, said water management device may consist of a single monolithic material.

In a more detailed feature of the invention, said water management device may be a solid polymer electrolyte membrane.

In a more detailed feature of the invention, said water management device may comprise a plurality of layers and/or materials.

In a more detailed feature of the invention, said water management device may comprise a support having a plurality of pores, and a solid polymer electrolyte may be disposed within the pores of the support.

In a more detailed feature of the invention, said water management device may comprise a solid polymer electrolyte.

In a more detailed feature of the invention, the solid polymer electrolyte may be one or a combination of different ionomers including but not limited to: polyethylene, polyethylene-polystyrene block with copolymers, polystyrene, polysulfone, polyphenylene, polyphenylene oxide, poly (arylene), poly(arylene pieridinium), poly(dialkylpiperidinium hydroxide), poly(dimethylammonium hydroxide), sulfonated polystyrene, sulfonated polysulfone, sulfonated poly(ether ether ketone), sulfonated poly(benzophenone), sulfonated poly(arylene ether sulfone), sulfonated poly (arylene ether ketone), sulfonated poly(arylene thioether), sulfonated poly(ether amide), sulfonated polybenzimidazole, sulfonated poly(phthalazinone ether), perfluorosulfonic acid, and poly(vinylidene fluoride).

In a more detailed feature of the invention, the electrochemical device may further comprise an anodic gas diffusion medium, said anodic gas diffusion medium may define an anode chamber, said anode chamber may have opposing first and second faces, said first face may be in contact with said anode, and said second face may be in contact with said water management device.

In a more detailed feature of the invention, said anodic gas diffusion medium may consist of a single layer of an electrically conductive, porous material.

In a more detailed feature of the invention, said anodic gas diffusion medium may comprise a plurality of layers, and each of the plurality of layers may comprise one or more electrically conductive, porous materials.

In a more detailed feature of the invention, said polymer electrolyte membrane, said anode, and said cathode may collectively form a membrane electrode assembly, the electrochemical device may further comprise an annular seal, and the annular seal may be mounted around the membrane electrode assembly.

In a more detailed feature of the invention, said polymer electrolyte membrane, said anode, and said cathode may collectively form a membrane electrode assembly, the electrochemical device may further comprise a first separator and a second separator, each of said first separator and said second separator may be electrically conductive, said first separator and said second separator may be positioned on opposite sides of said membrane electrode assembly, and said second separator may be positioned between said membrane electrode assembly and said water management device.

In a more detailed feature of the invention, the electrochemical device may be an electrochemical hydrogen compressor.

In a more detailed feature of the invention, the water management device may be coupled to the anode for use in delivering water thereto, and the anode may be positioned between the water management device and the polymer electrolyte membrane.

In a more detailed feature of the invention, the water management device may be coupled to the cathode for use in delivering water thereto, and the cathode may be positioned between the water management device and the polymer electrolyte membrane.

According to another aspect of the invention, there is provided an electrochemical device, the electrochemical device comprising (a) a polymer electrolyte membrane, said polymer electrolyte membrane having opposing first and second faces; (b) an anode coupled to the first face of said polymer electrolyte membrane; (c) a cathode coupled to the second face of said polymer electrolyte membrane; (d) a first water management device coupled to the anode for use in delivering water thereto, said first water management device being electrically non-conductive, permeable to liquids, and substantially impermeable to gases, said anode being positioned between the first water management device and the polymer electrolyte membrane; and (e) a second water management device coupled to the cathode for use in delivering water thereto, said second water management device being electrically non-conductive, permeable to liquids, and substantially impermeable to gases, said cathode being positioned between the second water management device and the polymer electrolyte membrane. Alternatively, in another embodiment, the first water management device and/or the second water management device may be electrically conductive.

According to yet another aspect of the invention, there is provided an electrochemical device, the electrochemical device comprising (a) a polymer electrolyte membrane, said polymer electrolyte membrane having opposing first and second faces; (b) an anode coupled to the first face of said polymer electrolyte membrane; (c) a cathode coupled to the second face of said polymer electrolyte membrane; and (d) a water management device coupled to the anode or the cathode for use in delivering water thereto, said water management device being permeable to liquids and substantially impermeable to gases, said water management device comprising opposing first and second faces, a first portion of said first face of said water management device being in direct contact with said anode or said cathode, a second portion of said first face of said water management device being spaced apart from said first face of said water management device.

In a more detailed feature of the invention, said water management device may be electrically conductive.

In a more detailed feature of the invention, said water management device may comprise a solid polymer electrolyte in which one or more types of electrically conductive materials may be dispersed.

In a more detailed feature of the invention, the electrically conductive material may comprise one or more types of electrically conductive particles.

In a more detailed feature of the invention, the electrically conductive material may comprise one or more types of non-particulate electrically conductive materials.

In a more detailed feature of the invention, the electrochemical device may further comprise an anodic gas diffusion medium, said anodic gas diffusion medium may define an anode gas chamber, said anode gas chamber may be in fluid communication with said anode, and said anodic gas diffusion medium may be positioned between said second portion of said first face of said water management device and said anode.

In a more detailed feature of the invention, the electrochemical device may further comprise an anodic fluid diffusion medium, said anodic fluid diffusion medium may define an anode liquid chamber, said anode liquid chamber may have opposing first and second faces, and said first face of said anodic liquid chamber may be in contact with said second face of said water management device.

In a more detailed feature of the invention, said water management device may have an undulating shape with a plurality of peaks and valleys.

In a more detailed feature of the invention, said water management device may consist of a single layer.

In a more detailed feature of the invention, said water management device may comprise a plurality of layers.

In a more detailed feature of the invention, the electrochemical device may be an electrochemical hydrogen compressor.

In a more detailed feature of the invention, the water management device may be coupled to the anode for use in delivering water thereto, and the first portion of the first face of the water management device may be in direct contact with the anode.

In a more detailed feature of the invention, the water management device may be coupled to the cathode for use in delivering water thereto, and the first portion of the first face of the water management device may be in direct contact with the cathode.

According to still another aspect of the invention, there is provided an electrochemical device, the electrochemical device comprising (a) a polymer electrolyte membrane, said polymer electrolyte membrane having opposing first and second faces; (b) an anode coupled to the first face of said polymer electrolyte membrane; (c) a cathode coupled to the second face of said polymer electrolyte membrane; (d) a first water management device coupled to the anode for use in delivering water thereto, said first water management device being permeable to liquids and substantially impermeable to gases, said first water management device comprising opposing first and second faces, a first portion of said first face of said first water management device being in direct contact with said anode, a second portion of said first face of said first water management device being spaced apart from said first face of said first water management device; and (e) a second water management device coupled to the cathode for use in delivering water thereto, said second water management device being permeable to liquids and substantially impermeable to gases, said second water management device comprising opposing first and second faces, a first portion of said first face of said second water management device being in direct contact with said cathode, a second portion of said first face of said second water management device being spaced apart from said first face of said second water management device.

According to still yet another aspect of the invention, there is provided a system for electrochemically compressing hydrogen, the system comprising (a) an electrochemical hydrogen compressor, the electrochemical hydrogen compressor comprising (i) a polymer electrolyte membrane, said polymer electrolyte membrane having opposing first and second faces, (ii) an anode coupled to the first face of said polymer electrolyte membrane, (iii) a cathode coupled to the second face of said polymer electrolyte membrane, wherein the polymer electrolyte membrane, the anode and the cathode collectively form a membrane electrode assembly, (iv) an anodic gas diffusion medium defining an anode chamber in fluid communication with said anode, said anodic gas diffusion medium having opposing first and second faces, said first face facing towards said anode, (v) a cathodic gas diffusion medium defining a cathode chamber in fluid communication with said cathode, said cathodic gas diffusion medium having opposing first and second faces, said first face facing towards said cathode, (vi) a water management device, said water management device being permeable to liquids, and substantially impermeable to gases, said water management device being in contact with said second face of said anodic gas diffusion medium, and (vii) first and second electrically conductive separators, the first and second electrically conductive separators being located on opposite sides of the membrane electrode assembly and electrically coupled to the membrane electrode assembly; (b) a low pressure hydrogen supply, the low pressure hydrogen supply adapted to contain hydrogen at a comparatively low pressure, the low pressure hydrogen supply being coupled to the anodic gas diffusion medium so as to deliver hydrogen thereto; (c) a high pressure hydrogen collector, the high pressure hydrogen collector adapted to contain hydrogen at a comparatively high pressure, the high pressure hydrogen collector being coupled to the cathodic gas diffusion medium so as to receive hydrogen therefrom; (d) a water supply, the water supply adapted to contain a volume of water, the water supply being coupled to the water management device so as to deliver water thereto; and (e) a power source, the power source being adapted to be electrically coupled to the first and second separators. Alternatively, in another embodiment, the water management device may be in contact with the second face of the cathodic gas diffusion medium, or there may be two water management devices, wherein one of the two water management devices may be in contact with the second face of the anodic gas diffusion medium and the other of the two water management devices may be in contact with the second face of the cathodic gas diffusion medium.

In a more detailed feature of the invention, the water management device may be electrically non-conductive.

In a more detailed feature of the invention, the water management device may be electrically conductive.

According to a further aspect of the invention, there is provided a system for electrochemically compressing hydrogen, the system comprising (a) an electrochemical hydrogen compressor, the electrochemical hydrogen compressor comprising (i) a polymer electrolyte membrane, said polymer electrolyte membrane having opposing first and second faces, (ii) an anode coupled to the first face of said polymer electrolyte membrane, (iii) a cathode coupled to the second face of said polymer electrolyte membrane, wherein the polymer electrolyte membrane, the anode and the cathode collectively form a membrane electrode assembly, (iv) a cathodic gas diffusion medium defining a cathode chamber in fluid communication with said cathode, said cathodic gas diffusion medium having opposing first and second faces, said first face facing towards said cathode, (v) a water management device coupled to the anode for use in delivering water thereto, said water management device being permeable to liquids and substantially impermeable to gases, at least a portion of said water management device being spaced apart from said anode, said water management device defining, at least in part, a first space on a side thereof facing towards the anode and a second space on another side thereof facing away from the anode, and (vi) first and second electrically conductive separators, the first and second electrically conductive separators being located on opposite sides of the membrane electrode assembly and electrically coupled to the membrane electrode assembly; (b) a low pressure hydrogen supply, the low pressure hydrogen supply adapted to contain hydrogen at a comparatively low pressure, the low pressure hydrogen supply being coupled to the first space so as to deliver hydrogen thereto; (c) a high pressure hydrogen collector, the high pressure hydrogen collector adapted to contain hydrogen at a comparatively high pressure, the high pressure hydrogen collector being coupled to the cathodic gas diffusion medium so as to receive hydrogen therefrom; (d) a water supply, the water supply adapted to contain a volume of water, the water supply being coupled to the second space so as to deliver water thereto; and (e) a power source, the power source being adapted to be electrically coupled to the first and second separators. Alternatively, in another embodiment, the water management device may be coupled to the cathode, or there may be two water management devices, wherein one of the two water management devices may be coupled to the anode and the other of the two water management devices may be coupled to the cathode.

In a more detailed feature of the invention, said water management device may be electrically conductive.

In a more detailed feature of the invention, said water management device may be electrically non-conductive.

In a more detailed feature of the invention, a first portion of said water management device may be in contact with said anode and a second part of said water management device may be spaced apart from the anode.

In a more detailed feature of the invention, all of said water management device may be spaced apart from said anode.

According to still a further aspect of the invention, there is provided a system for electrochemically compressing hydrogen, the system comprising (a) an electrochemical hydrogen compressor, the electrochemical hydrogen compressor comprising (i) a polymer electrolyte membrane, said polymer electrolyte membrane having opposing first and second faces, (ii) an anode coupled to the first face of said polymer electrolyte membrane, (iii) a cathode coupled to the second face of said polymer electrolyte membrane, wherein the polymer electrolyte membrane, the anode and the cathode collectively form a membrane electrode assembly, (iv) a cathodic gas diffusion medium defining a cathode chamber in fluid communication with said cathode, said cathodic gas diffusion medium having opposing first and second faces, said first face facing towards said cathode, (v) a water management device, said water management device being electrically non-conductive, permeable to liquids, and substantially impermeable to gases, said water management device being positioned in fluid communication with said anode, and (vi) first and second electrically conductive separators, the first and second electrically conductive separators being located on opposite sides of the membrane electrode assembly and electrically coupled to the membrane electrode assembly; (b) a low pressure hydrogen supply, the low pressure hydrogen supply adapted to contain hydrogen at a comparatively low pressure, the low pressure hydrogen supply being coupled to the anode so as to deliver hydrogen thereto; (c) a high pressure hydrogen collector, the high pressure hydrogen collector adapted to contain hydrogen at a comparatively high pressure, the high pressure hydrogen collector being coupled to the cathodic gas diffusion medium so as to receive hydrogen therefrom; (d) a water supply, the water supply adapted to contain a volume of water, the water supply being coupled to the water management device so as to deliver water thereto; and (e) a power source, the power source being adapted to be electrically coupled to the first and second separators. Alternatively, in another embodiment, the water management device may be positioned in fluid communication with the cathode, or there may be two water management devices, wherein one of the two water management devices may be positioned in fluid communication with the anode and the other of the two water management devices may be positioned in fluid communication with the cathode.

In a more detailed feature of the invention, the system may further comprise an anodic gas diffusion medium, and the anodic gas diffusion medium may be positioned between the anode and the water management device.

In a more detailed feature of the invention, the water management device may be planar.

In a more detailed feature of the invention, the water management device may be non-planar.

According to still yet a further aspect of the invention, there is provided a method for compressing hydrogen, the method comprising the steps of (a) providing any one of the systems described above and (b) operating the system.

According to still yet a further aspect of the invention, there is provided a method of making a membrane electrode assembly, the method comprising the steps of (a) providing a planar piece of a polymer electrolyte membrane; (b) then, spray-coating platinum-carbon on each of the two major surfaces of the planar piece of the polymer electrolyte membrane; (c) then, applying a gas diffusion medium to each of the two exposed surfaces of the spray-coated polymer electrolyte membrane; and (d) then, applying a polyimide/thermoplastic gasket to the gas diffusion medium/coated polymer electrolyte membrane.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions for purposes of explication. In the drawings wherein like reference numeral represent like parts.

DETAILED DESCRIPTION OF THE INVENTION

The present invention relates to the development of a polymer electrolyte membrane (PEM)-based electrochemical hydrogen compressor (EHC) stack design that employs a water management (or humidifying) membrane to maintain passive water feed to the PEM. Water management of the PEM is essential to maintaining stable uninterruptable EHC performance when electrochemically compressing hydrogen from ambient pressure to pressures ranging from 1 bar to above 2000 bar.

Figure 1:
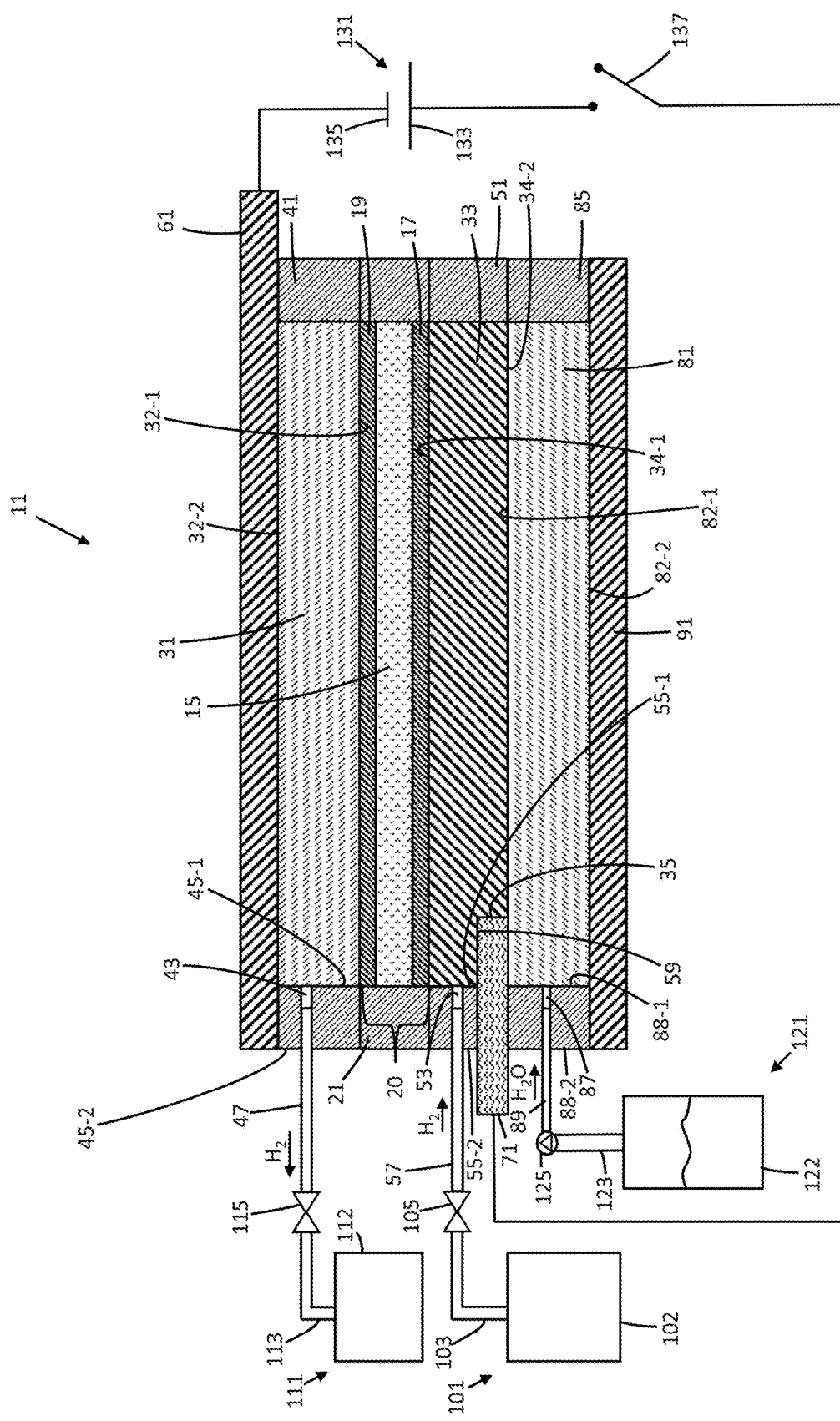
FIG. 1 is a simplified schematic view, partly in section, of a first embodiment of a system for electrochemically compressing gaseous hydrogen according to the present invention.

Referring now to FIG. 1, there is shown a simplified schematic view, partly in section, of a first embodiment of a system for electrochemically compressing gaseous hydrogen, the system being constructed according to the present invention and being represented generally by reference numeral 11. Details of system 11 that are not critical to an understanding of the present invention may be omitted from FIG. 1 or from the accompanying description herein or may be described herein or shown in FIG. 1 in a simplified manner.

System 11 may comprise an electrochemical hydrogen compressor 13. Electrochemical hydrogen compressor 13, in turn, may comprise a solid polymer electrolyte membrane (PEM) 15 (also known in the art as a proton exchange membrane). Polymer electrolyte membrane 15 is preferably a non-porous, ionically-conductive, electrically-non-conductive, liquid-permeable and substantially gas-impermeable membrane. Polymer electrolyte membrane 15 may consist of or comprise a homogeneous perfluorosulfonic acid (PFSA) polymer. Said PFSA polymer may be formed by the copolymerization of tetrafluoroethylene and perfluorovinylether sulfonic acid. See e.g., U.S. Pat. No. 3,282,875, inventors Connolly et al., issued Nov. 1, 1966; U.S. Pat. No. 4,470,889, inventors Ezzell et al., issued Sep. 11, 1984; U.S. Pat. No. 4,478,695, inventors Ezzell et al., issued Oct. 23, 1984; and U.S. Pat. No. 6,492,431, inventor Cisar, issued Dec. 10, 2002, all of which are incorporated herein by reference in their entireties. A commercial embodiment of a PFSA polymer electrolyte membrane is manufactured by The Chemours Company FC, LLC (Fayetteville, NC) as NAFION® extrusion cast PFSA polymer membrane.

Polymer electrolyte membrane 15 may be a generally planar unitary structure in the form of a continuous film or sheet. In the present embodiment, when viewed from above or below, polymer electrolyte membrane 15 may have a generally circular or disc shape. Moreover, the overall shape of electrochemical hydrogen compressor 13, when viewed from above or below, may correspond generally to the shape of polymer electrolyte membrane 15. However, it is to be understood that polymer electrolyte membrane 15, as well as electrochemical hydrogen compressor 13 as a whole, is not limited to a generally circular or disc shape and may have, for example, a rectangular shape or any other suitable shape.

Electrochemical hydrogen compressor 13 may further comprise an anode 17 and a cathode 19. Anode 17 and cathode 19 may be positioned along two opposing major faces of polymer electrolyte membrane 15. In the present embodiment, anode 17 is shown positioned along the bottom face of polymer electrolyte membrane 15, and cathode 19 is shown positioned along the top face of polymer electrolyte membrane 15; however, it is to be understood that the positions of anode 17 and cathode 19 could be reversed so that cathode 19 is positioned along the bottom face of polymer electrolyte membrane 15 and anode 17 is positioned along the top face of polymer electrolyte membrane 15. Although not shown in FIG. 1, anode 17 may comprise an anode electrocatalyst layer and an anode support, and cathode 19 may comprise a cathode electrocatalyst layer and a cathode support. Anode 17 and cathode 19 may be similar or identical to the types of anodes and cathodes conventionally used in PEM-based electrochemical cells, and, in particular, may consist of or comprise anodes and cathodes of the types disclosed in the various documents incorporated herein by reference.

The combination of polymer electrolyte membrane 15, anode 17, and cathode 19 may be regarded collectively as a membrane-electrode assembly (MEA) 20.

Electrochemical hydrogen compressor 13 may further comprise an MEA seal 21. MEA seal 21, which may be a generally annular or frame-like structure mounted around and slightly overlapping the periphery of MEA 20 in a fluid-tight manner, may consist of or comprise a material that is ionically-non-conductive, electrically-non-conductive, non-porous, and substantially fluid-impermeable. In some cases, MEA 20 and MEA seal 21 may form a unitized assembly, and MEA seal 21 may enable MEA 20 to withstand high clamping loads of several hundred or higher kilonewton (e.g., 400 kN), thereby providing resistance to pressure and thermal cycling. One manner of making a unitized assembly of MEA 20 and MEA seal 21 is (i) to provide a planar piece of a polymer electrolyte membrane (e.g., NAFION® extrusion cast PFSA polymer membrane); (ii) then, spray-coat platinum-carbon on each of the two major surfaces of the planar piece of polymer electrolyte membrane; (iii) then, apply a gas diffusion medium to each of the two exposed surfaces of the spray-coated polymer electrolyte membrane; and (iv) then, apply (e.g., via hot-press) a polyimide/thermoplastic gasket to the aforementioned gas diffusion medium/coated polymer electrolyte membrane. The aforementioned gas diffusion medium may comprise, for example, a porous sinter or other suitable gas diffusion medium as described below.

Electrochemical hydrogen compressor 13 may further comprise gas diffusion media 31 and 33. Gas diffusion medium 31, which may define a cathodic chamber in fluid communication with cathode 19, may include a first face 32-1 in contact with cathode 19 and may also include an opposite face 32-2 facing away from cathode 19. Gas diffusion medium 33, which may define an anodic chamber in fluid communication with anode 17, may include a first face 34-1 in contact with anode 17 and may also include an opposite face 34-2 facing away from anode 17. As will be discussed further below, a recessed area 35 may be provided in first face 34-1 of gas diffusion medium 33 to receive an electrically-conductive separator.

Gas diffusion media 31 and 33 may consist of or comprise any one or more types of dimensionally stable, electrically-conductive, chemically-inert, porous materials capable of receiving and distributing a quantity of gas. Gas diffusion media 31 and 33 may consist of, may comprise, or may be similar to gas diffusion media of the types conventionally used in PEM-based electrochemical cells and/or the gas diffusion media disclosed in the documents incorporated herein by reference, such gas diffusion media including, but not being limited to, carbon fiber papers, carbon cloths, metal meshes, metal screens, metal-coated polymer meshes, perforated metal sheets, and sintered metal particle sheets. From a materials standpoint, gas diffusion media 31 and 33 may be made of or comprise materials including, but not limited to, carbon, molybdenum, niobium, osmium, rhenium, stainless steel, tantalum, titanium, tungsten, and zirconium.

In one embodiment, each of gas diffusion media 31 and 33 may consist of or comprise one or more of the following: carbon fiber papers, carbon cloths, metal meshes, metal screens, metal-coated polymer meshes, perforated metal sheets, sintered metal particle sheets, or combinations of the foregoing. Although each of gas diffusion media 31 and 33 is shown in FIG. 1 as a single layer, it is to be understood that one or both of gas diffusion media 31 and 33 may comprise a plurality of layers and/or materials and that the constituent layers of a plurality of layers may be similar or dissimilar to one another dimensionally, compositionally, or otherwise.

Gas diffusion medium 31 and gas diffusion medium 33 need not be dimensionally and/or compositionally identical to one another. For example, in one embodiment, gas diffusion medium 31 may comprise a stacked combination of two different types of gas diffusion media, such as a carbon fiber paper and a sintered metal particle sheet, or some other combination of two or more of the following: carbon fiber papers, carbon cloths, metal meshes, metal screens, metal-coated polymer meshes, perforated metal sheets, sintered metal particle sheets. By contrast, gas diffusion medium 33 may comprise one or more layers of sintered metal particle sheets. One or more portions of gas diffusion medium 33 may be treated with a hydrophobic material, such as polytetrafluoroethylene, to minimize the pooling of water at the interface with anode 17.

Electrochemical hydrogen compressor 13 may further comprise a gas diffusion medium frame 41. Gas diffusion medium frame 41 may be a generally annular or frame-like structure mounted around the periphery of gas diffusion medium 31 in a fluid-tight manner. Frame 41, which may be similar or identical to frames of the type conventionally used in PEM-based electrochemical cells, may consist of or comprise one or more dimensionally stable, chemically inert, ionically-non-conductive, and electrically-non-conductive materials. Frame 41 may be non-porous and substantially fluid-impermeable, except that frame 41 may include a fluid port 43 extending radially outwardly from an inner periphery 45-1 of frame 41 to an outer periphery 45-2 of frame 41. Alternatively, fluid port 43 may extend axially out of frame 41. As will be discussed further below, a length of tubing 47 may be fluidly coupled to fluid port 43 so that hydrogen gas, which may be generated at cathode 19, may flow from gas diffusion medium 31 into tubing 47 through fluid port 43.

Electrochemical hydrogen compressor 13 may further comprise a gas diffusion medium frame 51. Gas diffusion medium frame 51 may be a generally annular or frame-like structure mounted around the periphery of gas diffusion medium 33 in a fluid-tight manner. Frame 51, which may be similar or identical to frames of the type conventionally used in PEM-based electrochemical cells, may consist of or comprise one or more dimensionally stable, chemically inert, ionically-non-conductive, and electrically-non-conductive materials. Frame 51 may be non-porous and substantially fluid-impermeable, except that frame 51 may include a fluid port 53 extending radially outwardly from an inner periphery 55-1 of frame 51 to an outer periphery 55-2 of frame 51. Alternatively, fluid port 53 may extend axially out of frame 51. As will be discussed further below, a length of tubing 57 may be fluidly coupled to fluid port 53 so that hydrogen gas may be delivered to gas diffusion medium 33 from tubing 57 through fluid port 53. Frame 51 may also be shaped to include a recessed area 59 for receiving an electrically-conductive separator.

Electrochemical hydrogen compressor 13 may further comprise a separator 61. Separator 61, which may be similar or identical to separators of the type conventionally used in PEM-based electrochemical cells, may be an electrically-conductive, dimensionally stable, chemically inert structure mounted on top of gas diffusion medium 31 and frame 41 in a fluid-tight manner.

Electrochemical hydrogen compressor 13 may further comprise a separator 71. Separator 71, which may be similar or identical to separators of the type conventionally used in PEM-based electrochemical cells, may be an electrically-conductive, dimensionally stable, chemically inert structure disposed within area 59 of gas diffusion medium frame 51 and within area 35 of gas diffusion medium 33 in a fluid-tight manner.

Electrochemical hydrogen compressor 13 may further comprise a water management or humidifying membrane 81. As will be discussed further below, humidifying membrane 81 may be used to supply water vapor to the hydrogen gas present within gas diffusion medium 33. Humidifying membrane 81, which may be a non-porous, liquid-permeable, substantially gas-impermeable structure, may comprise a first face 82-1 and a second face 82-2. First face 82-1 may be in direct contact with face 34-2 of gas diffusion medium 33.

According to one embodiment, humidifying membrane 81 may be similar or identical to membrane 31 of U.S. Pat. No. 9,595,727 and/or membrane 31 of U.S. Pat. No. 8,551,670. As such, humidifying membrane 81 may consist of or comprise a solid polymer electrolyte into which electrically-conductive materials, either particulate or non-particulate, are dispersed. Examples of suitable materials for use as the solid polymer electrolyte may include all ionomers such as, but not limited to, sulfonated aromatics, anion exchange membranes, or any hydrophilic membrane that may have appreciable water uptake and therefore high water permeability. Alternatively stated, suitable materials may include (i) polymer compositions that contain metal salts; (ii) polymeric gels that contain electrolytes; and (iii) ion exchange resins. More specifically, the solid polymer electrolyte may be, for example, a cation exchange ionomer membrane where the cation exchange group may be, but is not limited to, $-SO_3^-$, $-SO_2NH^+$, $-PO_3^{2-}$, or $-CO_2^-$ or may be, for example, an anion exchange ionomer membrane where the anion exchange group may be, but is not limited to, $-NH_2^+$. Specific examples may include, but are not limited to, the following: polyethylene, polyethylene-polystyrene block with copolymers, polystyrene, polysulfone, polyphenylene, polyphenylene oxide, poly(arylene), poly(arylene pieridinium), poly(dialkylpiperidinium hydroxide), poly(dimethylammonium hydroxide), sulfonated polystyrene, sulfonated polysulfone, sulfonated poly(ether ether ketone), sulfonated poly(benzophenone), sulfonated poly(arylene ether sulfone), sulfonated poly(arylene ether ketone), sulfonated poly(arylene thioether), sulfonated poly(ether amide), sulfonated polybenzimidazole, sulfonated poly(phthalazinone ether), perfluorosulfonic acid, poly(vinylidene fluoride), and mixtures or combinations thereof. A preferred material for use as the solid polymer electrolyte is a perfluorosulfonic acid (PFSA) membrane, such as is commercially available as NAFION[7] PFSA polymer. Examples of materials that may be used in place of NAFION[7] PFSA are disclosed in U.S. Patent Application Publication No. US 2006/0183011 A1, inventors Mittelsteadt et al., which was published Aug. 17, 2006, and which is incorporated herein by reference in its entirety.

Examples of materials suitable for use as dispersed, electrically-conductive particles of humidifying membrane 81 may include, but are not limited to, carbon black, metal particles (e.g., niobium particles, platinum particles, titanium particles, or combinations thereof), supported metal particles, and combinations thereof. Examples of materials suitable for use as dispersed, non-particulate, electrically-conductive materials of humidifying membrane 81 may include high-aspect-ratio, electrically-conductive materials, such as carbon nanotubes, carbon nanofibers, metal nanowires, or combinations thereof. Carbon nanotubes particularly well-suited for use in humidifying membrane 81 may have a diameter of about 0.20 nm to about 100 nm, preferably about 0.4 nm to about 80 nm, more preferably about 0.5 nm to 60 nm, and even more preferably about 0.50 nm to 50 nm. In addition, carbon nanotubes particularly well-suited for use in humidifying membrane 81 may have a length of about 0.50 μm to about 200 μm and may have an aspect ratio (i.e., length/diameter) in the range of about 5 to about 1,000,000. Additionally, carbon nanotubes particularly well-suited for use in humidifying membrane 81 may be non-functionalized or may include one or more functional groups, such as, but not limited to, $-COOH$, $-PO_4^-$, $-SO_3H$, $-SH$, $-NH_2$, tertiary amines, quaternary amines, $-CHO$, $-OH$, $-NO_2$, and $-PO_3^{2-}$. Moreover, carbon nanotubes particularly well-suited for use in humidifying membrane 81 may include single-walled carbon nanotubes, double-walled carbon nanotubes, multi-walled carbon nanotubes, or combinations thereof. Carbon nanofibers particularly well-suited for use in humidifying membrane 81 may be non-functionalized or may include one or more functional groups, such as, but not limited to, $-COOH$, $-PO_4$, $-SO_3H$, $-SH$, $-NH_2$, tertiary amines, quaternary amines, $-CHO$, $-OH$, $-NO_2$, and $-PO_3^{2-}$. Humidifying membrane 81 may be prepared by adding the electrically-conductive materials to the ionomer while the ionomer is in suspension form and then drying the suspension.

According to another embodiment, humidifying membrane 81 may lack the above-described electrically-conductive particles or electrically-conductive non-particulate materials and may not be electrically conductive. This may be preferable in the present embodiment, in which humidifying membrane 81 is typically not located between separators 61 and 71.

As noted above, humidifying membrane 81 is preferably substantially gas-impermeable and liquid-permeable. As a result, humidifying membrane 81 may substantially prevent hydrogen gas that is present within gas diffusion medium 33 from escaping from gas diffusion medium 33 by traveling downwardly through humidifying membrane 33. At the same time, and perhaps more importantly, humidifying membrane 81 may serve to humidify the hydrogen gas that is present within gas diffusion medium 33 by allowing liquid water delivered to humidifying membrane 81 to wick upwardly through membrane 81 and to be released into gas diffusion medium 33, where it may then humidify the hydrogen gas that is present in gas diffusion medium 33. (Due to the abundance of water in gas diffusion medium 33, access of hydrogen gas to the pores of anode 17 may be impeded by the high concentration of water. This may be mitigated by treating anode 17 with a hydrophobic material, such as polytetrafluoroethylene, that allows both hydrogen and water to gain access to the pores of anode 17.)

Although humidifying membrane 81 is shown in FIG. 1 as a single monolithic layer, it is to be understood that humidifying membrane 81 may comprise a plurality of layers and/or materials and that the constituent layers of a plurality of layers may be similar or dissimilar to one another dimensionally, compositionally, or otherwise. For example, humidifying membrane 81 may comprise, in addition to the material described above, a porous support designed to provide humidifying membrane 81 with improved dimensional stability, with the humidifying membrane 81 being hot-pressed into the pores of the porous support. Examples of porous supports suitable for this purpose are known conventionally and/or are included in one or more of the documents incorporated herein by reference. Alternatively, humidifying membrane 81 may be coupled to a sealing material in a fashion analogous to that discussed above for MEA 20 and MEA seal 21. Such an arrangement may be desirable for systems in which very high differential pressures may be attained (e.g., at least 5000 psi) but may not be needed for systems in which lower differential pressures are attained (e.g., below 5000 psi). Alternatively, humidifying membrane 81 could comprise a material like carbon filter paper impregnated with a material like NAFION[7] PFSA polymer.

Electrochemical hydrogen compressor 13 may further comprise a humidifying membrane frame 85. Humidifying membrane frame 85 may be a generally annular or frame-like structure mounted around the periphery of humidifying membrane 81 in a fluid-tight manner. Frame 85, which may be similar or identical to frames of the type conventionally used in PEM-based electrochemical cells, may consist of or comprise one or more dimensionally stable, chemically inert, ionically-non-conductive, and electrically-non-conductive materials. Frame 85 may be non-porous and substantially fluid-impermeable, except that frame 85 may include a fluid port 87 extending radially outwardly from an inner periphery 88-1 of frame 85 to an outer periphery 88-2 of frame 85. Alternatively, fluid port 87 may extend axially out of frame 85. As will be discussed further below, a length of tubing 89 may be fluidly coupled to fluid port 87 so that water may be delivered from tubing 89 through port 87 to humidifying membrane 81. In another embodiment (not shown), instead of surrounding humidifying membrane 81 with frame 85, frame 85 may surround a porous medium, and humidifying membrane 81 may be positioned between the porous medium and gas diffusion medium 33. Consequently, water delivered through frame 85 would pass into the porous medium and then would pass from the porous medium into humidifying membrane 81. The porous medium may be similar in construction and composition to gas diffusion media 31 and 33.

Electrochemical hydrogen compressor 13 may further comprise a seal 91. Seal 91, which may be a chemically inert, electrically and ionically conductive or non-conductive, non-porous, liquid-impermeable and gas-impermeable material, may be disposed along face 82-2 of humidifying membrane 81. In this manner, seal 91 may serve to prevent water from escaping from humidifying membrane 81 through face 82-2.

System 11 may additionally comprise a low pressure hydrogen gas supply 101. Low pressure hydrogen gas supply 101, in turn, may comprise a container 102 for holding a quantity of hydrogen gas at a comparatively low pressure. For example, the comparatively low pressure may be from atmospheric (or sub-atmospheric) pressure to 1000 bar or greater, preferably 3 bar to 200 bar, more preferably 10 bar to 150 bar. A length of tubing 103 may be fluidly coupled at one end to container 102 and may be fluidly coupled at an opposite end to an on/off gas valve 105. On/off gas valve 105, in turn, may be fluidly coupled to tubing 57. In this manner, when on/off gas valve 105 is opened, hydrogen gas may flow from container 102 to gas diffusion medium 33.

System 11 may additionally comprise a high pressure hydrogen gas collector 111. High pressure hydrogen gas collector 111, in turn, may comprise a container 112 for holding a quantity of hydrogen gas at a comparatively high pressure. For example, the comparatively high pressure may be from atmospheric pressure to pressures ranging from 1 bar to 2000 bar or greater, preferably from 10 bar to 1000 bar, more preferably from 40 bar to 875 bar. A length of tubing 113 may be fluidly coupled at one end to container 112 and may be fluidly coupled at an opposite end to a back pressure regulating valve 115. Back pressure regulating valve 115 may, in turn, be fluidly coupled to tubing 47. In this manner, hydrogen gas may flow from gas diffusion medium 31 to container 112 and may be held in container 112 at great pressure.

System 11 may further comprise a water supply 121. Water supply 121, in turn, may comprise a quantity of water disposed within a container 122. A length of tubing 123 may be fluidly coupled at one end to water supply 121 and may be fluidly coupled at an opposite end to a pump 125. Pump 125, in turn, may be fluidly coupled to tubing 89. In this manner, water may be supplied from container 122 to humidifying membrane 81.

System 11 may further comprise a power source 131. Power source 131, which may be a battery or other source of electricity, may have a positive terminal 133 electrically coupled to separator 71 and may have a negative terminal 135 electrically coupled to separator 61. An on/off switch 137 may be provided to permit the electrical circuit to be selectively opened and closed. In one embodiment, system 11 may be run at less than or equal to 3 VDC and at 5 A/cm 2 or greater.

In use, on/off switch 137 may be closed, on/off gas valve 105 may be opened, and pump 125 may be actuated. The foregoing causes hydrogen gas to flow from container 102 into gas diffusion medium 33 and causes water to be delivered from container 122 to humidifying membrane 81. The hydrogen present within gas diffusion medium 33 may then be electrochemically pumped across MEA 20 into gas diffusion medium 31, from where it may then flow from gas diffusion medium 31 into container 112 for storage at high pressure. Concurrently with the above, water may be continuously released from humidifying membrane 81 into gas diffusion medium 33 and may serve to humidify the hydrogen present within gas diffusion medium 33, thereby keeping polymer electrolyte membrane 15 properly hydrated as it operates.

Electrochemical hydrogen compressor 13 may be operated at a temperature in the range of approximately 0° C. to 150° C., preferably in the range of approximately 40° C. to 100° C., and more preferably in the range of approximately 60° C. to 95° C. Electrochemical hydrogen compressor 13 may have an active area of about 1 $cm^2$ to about 2000 $cm^2$ or greater, preferably about 50 $cm^2$ to about 1500 $cm^2$, and more preferably about 300 $cm^2$ to 1250 $cm^2$.

It is to be understood that, although system 11 is shown in FIG. 1 as having a single electrochemical hydrogen compressor 13, system 11 could comprise a plurality of electrochemical hydrogen compressors 13 that could be connected in series or otherwise.

Also, it is to be understood that, although system 11 is shown in FIG. 1 as having humidifying membrane 81 located on the anode side of the polymer electrolyte membrane 13, one could modify system 11 by positioning the humidifying membrane on the cathode side of the polymer electrolyte membrane 13 or by positioning a first humidifying membrane on the anode side of the polymer electrolyte membrane 13 and a second humidifying membrane on the cathode side of the polymer electrolyte membrane 13. In addition, although system 11 is shown in FIG. 1 as having humidifying membrane 81 spaced apart from MEA 20, one could modify system 11 so that humidifying membrane 81 is in direct contact with MEA 20. Additionally, it is to be understood that the cathode hydrogen gas could either be constructed as dead-ended or flow-through. Moreover, the anode and the cathode may be designed with or without edge collection.

Figure 2:
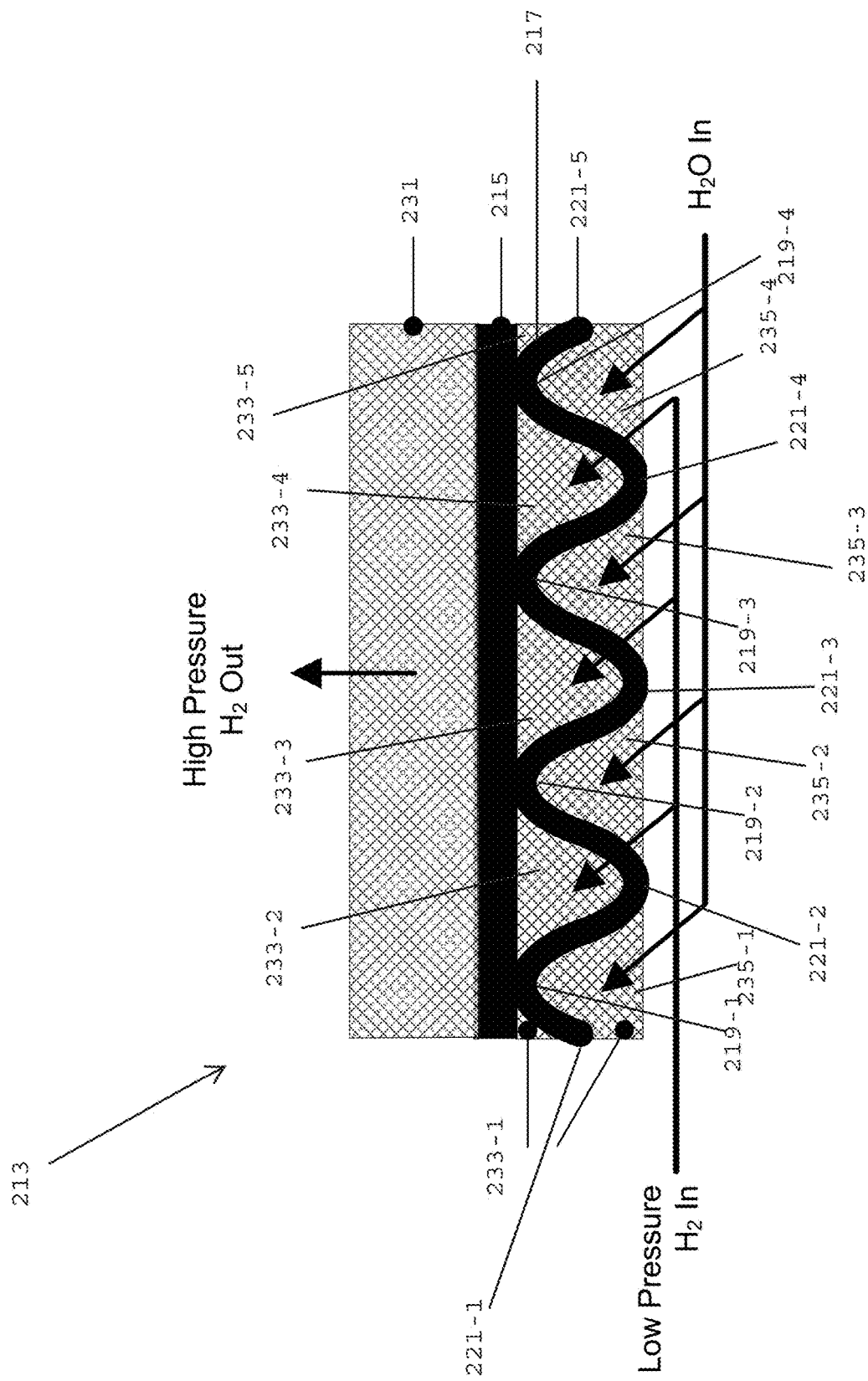
FIG. 2 is a simplified schematic view of an alternative electrochemical hydrogen compressor to the electrochemical hydrogen compressor shown in the system of FIG. 1.

Referring now to FIG. 2, there is shown a simplified schematic view of an alternative electrochemical hydrogen compressor to electrochemical hydrogen compressor 13, the alternative electrochemical hydrogen compressor being constructed according to the present invention and being represented generally by reference numeral 213. Details of electrochemical hydrogen compressor 213 that are not critical to an understanding of the present invention may be omitted from FIG. 2 or from the accompanying description herein or may be described herein or shown in FIG. 2 in a simplified manner. For example, for the sake of simplicity, many of the structural elements that are included in electrochemical hydrogen compressor 213, such as, but not limited to, frames, separators, seals, etc., are not shown in FIG. 2 and/or are not discussed herein or are discussed herein in a simplified manner.

Electrochemical hydrogen compressor 213 may comprise an MEA 215. MEA 215 may be similar or identical to MEA 20 of electrochemical hydrogen compressor 13.

Electrochemical hydrogen compressor 213 may further comprise a humidifying membrane 217. Humidifying membrane 217 may be similar in composition to humidifying membrane 81 of electrochemical hydrogen compressor 13; however, whereas humidifying membrane 81 of electrochemical hydrogen compressor 13 may be generally planar, humidifying membrane 217 of electrochemical hydrogen compressor 213 may have a wavy or undulating shape and may be shaped to include a plurality of peaks and valleys. For example, one or more portions of humidifying membrane 217, such as portions 219-1, 219-2, 219-3, and 219-4, may be in direct contact with MEA 215 whereas one or more other portions of humidifying membrane 217, such as portions 221-1, 221-2, 221-3, 221-4, and 221-5 may be spaced away from and not in direct contact with MEA 215. (In another embodiment (not shown), the entirety of humidifying membrane 217 may be spaced away from MEA 215.) Without wishing to be limited to any particular theory of operation of humidifying membrane 217, the present inventors believe that the wavy or undulating shape of humidifying membrane 217 may be advantageous in that the portions thereof that are in direct contact with MEA 215 are able to supply comparatively greater quantities of water to MEA 215 whereas the portions thereof that are spaced away from the MEA 215 may serve to minimize the flooding of MEA 215 with water.

Because portions of humidifying membrane 217 are in direct contact with MEA 215 and because humidifying membrane 217 is preferably located between separators (not shown) electrically coupled to a power source (not shown), humidifying membrane 217 preferably includes electrically conductive particles and/or electrically conductive non-particulate materials of the types discussed above in connection with humidifying membrane 81.

Due to its undulating shape, humidifying membrane 217 may define, at least in part, one or more spaces thereabove and one or more spaces therebelow. Preferably, humidifying membrane 217 is shaped so that the combined volume of space above humidifying membrane 217 is approximately equal to the combined volume of space below humidifying membrane 217; however, humidifying membrane 217 need not be so shaped.

Electrochemical hydrogen compressor 213 may further comprise a gas diffusion medium 231. Gas diffusion medium 231, which may be similar or identical, compositionally and/or dimensionally, to gas diffusion medium 31, may be positioned directly over MEA 215 and may be used to receive the hydrogen generated at the cathode side (which, in the present embodiment, is the upper side) of MEA 215.

Electrochemical hydrogen compressor 213 may further comprise a plurality of gas diffusion media 233-1 through 233-5. Gas diffusion media 233-1 through 233-5 may be similar or identical, compositionally, to one another and may be similar or identical, compositionally, to gas diffusion medium 33. Gas diffusion media 233-1 through 233-5 may be positioned within correspondingly shaped spaces located between humidifying membrane 217 and MEA 215 and may be used to receive hydrogen that has been supplied from a low pressure hydrogen gas supply.

Electrochemical hydrogen compressor 213 may further comprise a plurality of fluid diffusion media 235-1 through 235-4. Fluid diffusion media 235-1 through 235-4 may be similar or identical, compositionally, to one another and may be similar or identical, compositionally, to gas diffusion medium 33. Fluid diffusion media 235-1 through 235-4 may be positioned within correspondingly shaped spaces below humidifying membrane 217 and may be used to receive water that has been supplied from a water supply.

As can be appreciated, because, in the present embodiment, gas diffusion media 233-1 through 233-5 are shown as being fluidly distinct from one another, hydrogen gas from the low pressure hydrogen gas supply is preferably supplied to each of gas diffusion media 233-1 through 233-5 through some sort of manifold structure. In an analogous fashion, because, in the present embodiment, fluid diffusion media 235-1 through 235-4 are shown as being fluidly distinct from one another, water from the water supply is preferably supplied to each of fluid diffusion media 235-1 through 235-4 through some sort of manifold structure.

Electrochemical hydrogen compressor 213 may be used in a manner that is similar in many respects to that described above for electrochemical hydrogen compressor 13. More specifically, hydrogen gas at a comparatively low pressure may be delivered from a hydrogen gas supply to gas diffusion media 233-1 through 233-5, and water may be delivered from a water supply to fluid diffusion media 235-1 through 235-4. The water in fluid diffusion media 235-1 through 235-4 may then be taken up by humidifying membrane 217 and then released by humidifying membrane 217 into gas diffusion media 233-1 through 233-5, where it may be used to humidify the hydrogen gas present therewithin. The humidified hydrogen gas may then be electrochemically reacted at MEA 215, and the hydrogen gas outputted from MEA 215 may be conducted through gas diffusion medium 231 and then collected in a hydrogen gas collector with a back pressure regulator.

It is to be understood that, although electrochemical hydrogen compressor 213 is shown in FIG. 2 as having humidifying membrane 217 located on the anode side of MEA 215, one could modify electrochemical hydrogen compressor 213 by positioning the humidifying membrane on the cathode side of MEA 215 or by positioning a first humidifying membrane on the anode side of MEA 215 and a second humidifying membrane on the cathode side of MEA 215.

Some benefits, features, and advantages that may apply to one or more embodiments of the present invention may include the following:

The present invention allows for the continuous electrochemical compression of hydrogen, eliminating the need for mechanical compressors. Applicant has demonstrated high efficiency through the use of an electrochemical hydrogen compressor stack that operates at high current density and utilizes an advanced PEM and integral water management membrane. The present invention will provide PEM-based stacks with the ability to continuously deliver hydrogen at greater than 875 bar.

The electrochemical hydrogen compressor of the present invention has been designed with a selectively permeable water management membrane ("WaMM") that addresses the obstacles to commercialization of lower-cost, higher efficiency and improved durability.

The electrochemical hydrogen compressor (EHC) is a solid-state device with no moving parts. The solid-state device provides robust and maintenance free operation, thereby minimizing downtime.

The WaMM is a stationary item in the EHC which provides the water required for the continuous electrochemical compression of hydrogen. The WaMM is a polymer electrolyte membrane and an electrically conductive or non-conductive selectively permeable membrane.

The WaMM provides the water required for the electrochemical process allowing these systems to run continuously at optimal pressure, temperature and current density. In some cases, the WaMM provides humidification up to six times greater than can be supplied by external humidification (e.g., bubbling the gas through a volume of water).

The selectively permeable WaMM is operated in a manner to eliminate a major factor of membrane degradation and failure. The WaMM is operated in an oxygen deprived environment to prevent radical species from attacking the polymer and the sulfonic acid groups.

The WaMM supplies water sufficient for electrochemical operation of numerous polymers including low-cost aromatic membranes.

Cross-cutting technology: The WaMM is a real cross-cutting technology, providing the exact humidification required of a multitude of electrochemical processes.

The present invention can be used in a variety of different settings including, but not limited to the following: (i) Fuel Cells; (ii) Electrolyzers—The WaMM can provide the water required for hydrogen compression immediately after hydrogen generation by electrolysis or other means, providing a one-skid generation and compression solution; (iii) Home/Roadside-Refuelers—$H_2$ at pressure provides an opportunity for households to reduce their fossil fuel consumption by making home refuelers accessible; (iv) Hydrogen Purification/Separation—The WaMM makes hydrogen separation and purification possible in gases that lack sufficient moisture content (ex. Storage/Natural Gas appl.); (v) Hydrogen Circulation (Refrigeration); (vi) $H_2$ Sensor Applications—The WaMM allows for the detection of hydrogen in constituent gases by providing the moisture required for the process; and (vii) Power Generation (Reversible).

Water management in a closed system is difficult at best. The WaMM is the complete water management solution under varying operating parameters ($P_i$, $P_o$, $T_i$, A, $H_2O_d$).

The use of current technology leads to catalyst flooding or membrane dehydration, both of which decrease the efficiency of the electrochemical process. The WaMM provides the exact amount of water needed at the location of the reaction.

Most conventional membranes experience high electro-osmotic drag (EOD), carrying water six times faster than can be supplied by humidification. The WaMM prevents the drying of the membrane by supplying the moisture required by the electrochemical process and the electro-osmotic drag.

Current membrane technology has a limitation to the operating current density. The WaMM allows the system to operate at higher current density by providing the water required for increased mass transport and thermal management control.

In one embodiment, the WaMM may be used for individual cell cooling as required to remove the waste heat from the electrochemical process. In another embodiment, the entire stack cooling may be managed by the WaMM.

The WaMM is a semi-rigid structure that provides the durability and strength to operate under high differential pressures.

In one embodiment, the WaMM is a membrane strong enough to operate under the variable radial and axial loading of an electrochemical hydrogen compressor.

The active area of the WaMM is sealed within the individual cell, allowing for a safe and controlled electrochemical process.

Although the present invention has been described in the context of the electrochemical compression of hydrogen gas, the present invention could also be used to separate and to compress hydrogen from a mixture of gases including hydrogen gas. Similarly, it may be used to electrochemically compress or separate other components, including, but not limited to, oxygen, ammonia, carbon monoxide, and carbon dioxide.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An electrochemical device comprising:
   (a) a polymer electrolyte membrane, said polymer electrolyte membrane having opposing first and second faces;
   (b) an anode coupled to the first face of said polymer electrolyte membrane;
   (c) a cathode coupled to the second face of said polymer electrolyte membrane; and
   (d) a water management device in fluid communication with a source of water and extending through a gas diffusion medium to directly contact the anode or the cathode at a first point and a second point to deliver water to the anode or the cathode via said water management device, the first point spaced laterally from the second point, said water management device separated from the anode or the cathode between the first point and the second point, said water management device being electrically non-conductive, permeable to liquids, and substantially impermeable to gases, said anode or said cathode being positioned between the water management device and the polymer electrolyte membrane.

2. The electrochemical device as claimed in claim 1 further comprising an anodic gas diffusion medium, said anodic gas diffusion medium defining an anode chamber, said anode chamber being in fluid communication with said anode, said anodic gas diffusion medium being positioned between at least a portion of said water management device and said anode.

3. The electrochemical device as claimed in claim 2 wherein said anodic gas diffusion medium consists of a single layer of an electrically conductive, porous material.

4. The electrochemical device as claimed in claim 2 wherein said anodic gas diffusion medium comprises a plurality of layers, each of the plurality of layers comprising one or more electrically conductive, porous materials.

5. The electrochemical device as claimed in claim 1 wherein said water management device comprises a portion vertically spaced from the anode or the cathode between the first point and the second point.

6. The electrochemical device as claimed in claim 1 further comprising:
   a frame mounted around the water management device in a fluid-tight manner, the frame comprising a fluid port therethrough to allow a flow of water from the source of water to the water management device.

7. The electrochemical device as claimed in claim 1 wherein said water management device consists of a single monolithic material.

8. The electrochemical device as claimed in claim 7 wherein said water management device is a solid polymer electrolyte membrane.

9. The electrochemical device as claimed in claim 1 wherein said water management device comprises a plurality of layers and/or materials.

10. The electrochemical device as claimed in claim 9 wherein said water management device comprises a support having a plurality of pores and a solid polymer electrolyte disposed within the pores of the support.

11. The electrochemical device as claimed in claim 1 wherein said water management device comprises a solid polymer electrolyte.

12. The electrochemical device as claimed in claim 11 wherein the solid polymer electrolyte comprises at least one member selected from the group consisting of polyethylene, polyethylene-polystyrene block with copolymers, polystyrene, polysulfone, polyphenylene, polyphenylene oxide, poly(arylene), poly(arylene pieridinium), poly(diallypiperidinium hydroxide), poly(dimethylammonium hydroxide), sulfonated polystyrene, sulfonated polysulfone, sulfonated poly(ether ether ketone), sulfonated poly(benzophenone), sulfonated poly(arylene ether sulfone), sulfonated poly(arylene ether ketone), sulfonated poly(arylene thioether), sulfonated poly(ether amide), sulfonated polybenzimidazole, sulfonated poly(phthalazinone ether), perfluorosulfonic acid, poly(vinylidene fluoride), and combinations or mixtures thereof.

13. The electrochemical device as claimed in claim 1 wherein said polymer electrolyte membrane, said anode, and said cathode collectively form a membrane electrode assembly and wherein the electrochemical device further comprises an annular seal, the annular seal being mounted around the membrane electrode assembly.

14. The electrochemical device as claimed in claim 1 wherein said polymer electrolyte membrane, said anode, and said cathode collectively form a membrane electrode assembly, the electrochemical device further comprising a first separator and a second separator, wherein each of said first separator and said second separator are electrically conductive and wherein said first separator and said second separator are positioned on opposite sides of said membrane electrode assembly, with said second separator positioned between said membrane electrode assembly and said water management device.

15. The electrochemical device as claimed in claim 1 wherein the electrochemical device is an electrochemical hydrogen compressor.

16. The electrochemical device as claimed in claim 1 wherein the water management device comprises a first water management device and a second water management device, wherein the first water management device is coupled to the anode for use in delivering water thereto, wherein said first water management device is electrically non-conductive, permeable to liquids, and substantially impermeable to gases, wherein said anode is positioned between the first water management device and the polymer electrolyte membrane, wherein the second water management device is coupled to the cathode for use in delivering water thereto, wherein said second water management device is electrically non-conductive, permeable to liquids, and substantially impermeable to gases, and wherein said cathode is positioned between the second water management device and the polymer electrolyte membrane.

17. The electrochemical device as claimed in claim 16 wherein said water management device comprises a solid polymer electrolyte in which one or more types of electrically conductive materials are dispersed.

18. The electrochemical device of claim 16 wherein said water management device is hot pressed in the pores of the porous support.

19. An electrochemical device comprising:
(a) a polymer electrolyte membrane, said polymer electrolyte membrane having opposing first and second faces;
(b) an anode coupled to the first face of said polymer electrolyte membrane;
(c) a cathode coupled to the second face of said polymer electrolyte membrane;
(d) a water management device in fluid communication with a source of water and coupled to the anode or the cathode for use in delivering water thereto, said water management device being permeable to liquids and substantially impermeable to gases, said water management device comprising opposing first and second faces; and
(e) a porous support for providing dimensional stability, said the water management device received in pores of the porous support and wherein said water management device is electrically conductive.

* * * * *